United States Patent
Sagae et al.

(10) Patent No.: US 9,642,150 B2
(45) Date of Patent: May 2, 2017

(54) MOBILE STATION, RECEPTION METHOD, BASE STATION, AND METHOD OF CONTROLLING AN OPERATION OF A RECEIVER

(71) Applicant: NTT DOCOMO, INC., Tokyo (JP)

(72) Inventors: Yuta Sagae, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 14/654,851

(22) PCT Filed: Nov. 11, 2013

(86) PCT No.: PCT/JP2013/080442
§ 371 (c)(1),
(2) Date: Jun. 23, 2015

(87) PCT Pub. No.: WO2014/103540
PCT Pub. Date: Jul. 3, 2014

(65) Prior Publication Data
US 2015/0351104 A1 Dec. 3, 2015

(30) Foreign Application Priority Data
Dec. 28, 2012 (JP) ................ 2012-288897

(51) Int. Cl.
*H04W 72/08* (2009.01)
*H04W 76/04* (2009.01)
(Continued)

(52) U.S. Cl.
CPC .......... *H04W 72/082* (2013.01); *H04B 1/707* (2013.01); *H04B 1/71* (2013.01); *H04W 28/0236* (2013.01); *H04W 48/10* (2013.01); *H04W 76/046* (2013.01); *H04W 8/22* (2013.01); *H04W 48/12* (2013.01)

(58) Field of Classification Search
CPC ... H04J 11/005; H04W 72/082; H04W 24/02; H04W 24/10
See application file for complete search history.

(56) References Cited

U.S. PATENT DOCUMENTS

| 2008/0300004 | A1* | 12/2008 | Balachandran | ..... H04W 52/146 455/522 |
| 2013/0336149 | A1 | 12/2013 | Ishii et al. | |
| 2015/0139004 | A1* | 5/2015 | Fodor | ................ H04W 72/082 370/252 |

FOREIGN PATENT DOCUMENTS

| WO | 2011052869 A1 | 5/2011 |
| WO | 2011/163201 A1 | 12/2011 |
| WO | 2012/096299 A1 | 7/2012 |

OTHER PUBLICATIONS

International Search Report issued in PCT/JP2013/080442 mailed on Feb. 10, 2014 (1 page).

(Continued)

*Primary Examiner* — Jung Park
(74) *Attorney, Agent, or Firm* — Osha Liang LLP (57) ABSTRACT

In one aspect of the present invention, a mobile station includes a receiver type control signal reception unit configured to receive a receiver type control signal indicating whether to allow an operation of a receiver in association with at least one receiver type; and a receiver configuration unit configured to configure the operation of the receiver based on the received receiver type control signal.

9 Claims, 5 Drawing Sheets

(51) Int. Cl.
*H04W 48/10* (2009.01)
*H04W 28/02* (2009.01)
*H04B 1/71* (2011.01)
*H04B 1/707* (2011.01)
*H04W 8/22* (2009.01)
*H04W 48/12* (2009.01)

(56) References Cited

OTHER PUBLICATIONS

Written Opinion of the International Searching Authority issued in PCT/JP2013/080442 mailed on Feb. 10, 2014 (3 pages).
3GPP TR 36.829 V11.0.0; "3rd Generation Partnership Project; Technical Specification Group Radio Access Network; Enhanced performance requirement for LTE User Equipment (UE) (Release 11)"; Mar. 2012 (83 pages).
Extended European Search Report in counterpart European Patent Application No. 13868714.0, dated Jan. 5, 2016 (7 pages).
Office Action issued in corresponding Japanese Application No. 2012-288897, mailed Jan. 24, 2017 (5 pages).

\* cited by examiner

MOBILE STATION, RECEPTION METHOD, BASE STATION, AND METHOD OF CONTROLLING AN OPERATION OF A RECEIVER

TECHNICAL FIELD

The present invention relates to a mobile station, a reception method, a base station, and a method of controlling an operation of a receiver.

BACKGROUND ART

Various receiver types are developed for a receiver to obtain a desired signal from a received signal. In 3GPP (The 3rd Generation Partnership Project), standardization of a receiver is under discussion based on a precondition that a MMSE (Minimum Mean Square Error) or MRC (Maximum Ratio Combining) receiver type is used. According to the MMSE, a receiver obtains a desired signal by considering an interference signal as noise and minimizing the effect of the interference signal. According to the MRC, a receiver obtains a desired signal by maximizing a signal to interference plus noise ratio of a combined output.

On the other hand, an advanced receiver type is also under discussion to improve performance regarding interference from another cell (see 3GPP TR 36.829 V11.0.0 (2012-03)). For example, advanced receiver types such as MMSE-IRC (Minimum Mean Square Error-Interference Rejection Combining), CRS canceller (Common Reference Signal canceller), and so on are under discussion. According to these receiver types, a receiver can reduce or eliminate an interference signal and thus can improve quality of a desired signal.

In addition, an advanced receiver type such as SIC (Successive Interference Canceller) is also provided to improve quality of a desired signal by successively subtracting a replica of an interference signal from a received signal. A SIC receiver type in which error correction decoding is performed upon transmission signal estimation of an interference signal is specifically referred to as Turbo-SIC.

DISCLOSURE OF INVENTION

Problem(s) to be Solved by the Invention

Since an interference signal is reduced or eliminated according to an advanced receiver type, properties of the advanced receiver type vary depending on interference from another cell. Under the condition that detection of an interference signal is difficult, in particular, the interference signal is erroneously cancelled, thereby increasing an interference level and deteriorating quality of a desired signal.

Figure 1:
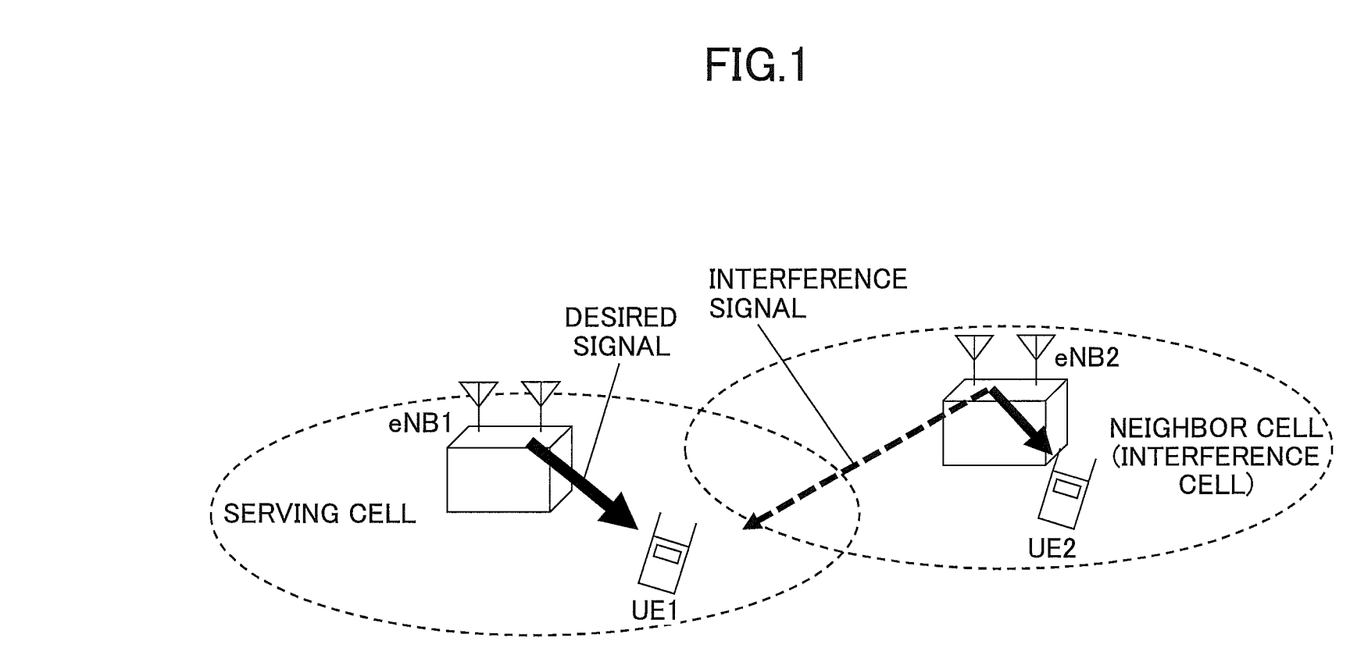
FIG. 1 shows an example of erroneously detecting or cancelling an interference signal.

FIG. 1 shows an example of erroneously detecting or cancelling an interference signal. As shown in FIG. 1, a mobile station UE1 is situated within a cell of a base station eNB1 and a mobile station UE2 is situated within a cell of a base station eNB2. The cell of the base station eNB2 is an interference cell for the mobile station UE1 and a signal transmitted from the base station eNB2 is an interference signal for the mobile station UE1.

When the mobile station UE2 is positioned near the base station eNB2 and signal quality such as a SINR (Signal to Interference plus Noise Ratio) between the mobile station UE2 and the base station eNB2 is better, the base station eNB2 can transmit signals to the mobile station UE2 with a multi-level modulation such as 64QAM (64 Quadrature Amplitude Modulation) or MIMO (Multiple Input Multiple Output) transmission. While the mobile station UE1 is positioned within a range in which a signal from the base station eNB2 arrives, quality of a signal from the base station eNB2 is poor because the mobile station UE1 is far from the base station eNB2. In this case, it is difficult for the mobile station UE1 to detect an interference signal. When an advanced receiver type such as MMSE-IRC, CRS canceller, or SIC is used, an interference signal is erroneously detected or cancelled. In this manner, an interference signal is erroneously cancelled, thereby increasing an interference level and deteriorating quality of a desired signal from the base station eNB1.

It is a general object of the present invention to improve quality of a desired signal in a mobile station by determining in a base station an interference condition caused by another cell, for example, and indicating whether to allow an operation of a receiver in association with a receiver type.

Means for Solving the Problem(s)

In one aspect of the present invention, there is provided a mobile station, including:
a receiver type control signal reception unit configured to receive a receiver type control signal indicating whether to allow an operation of a receiver in association with at least one receiver type; and
a receiver configuration unit configured to configure the operation of the receiver based on the received receiver type control signal.

In another aspect of the present invention, there is provided a reception method in a mobile station, including the steps of:
receiving a receiver type control signal indicating whether to allow an operation of a receiver in association with at least one receiver type; and
configuring the operation of the receiver based on the received receiver type control signal.

In another aspect of the present invention, there is provided a base station, including:
a receiver type control signal generation unit configured to generate a receiver type control signal indicating whether to allow an operation of a receiver in association with at least one receiver type; and
a receiver type control signal transmission unit configured to transmit the generated receiver type control signal.

In another aspect of the present invention, there is provided a method of controlling an operation of a receiver in a base station, including the steps of:
generating a receiver type control signal indicating whether to allow an operation of a receiver in association with at least one receiver type; and
transmitting the generated receiver type control signal.

Advantageous Effect of the Invention

According to the present invention, it is possible to improve quality of a desired signal in a mobile station.

DETAILED DESCRIPTION OF THE PREFERRED EMBODIMENTS

An embodiment of the present invention is described below with reference to the accompanying drawings.

In an embodiment of the present invention, a mobile station is described which obtains a desired signal from a received signal in a mobile communication system including a plurality of base stations. In order for the mobile station to obtain a desired signal from a received signal, at least one receiver type is used. A receiver type means an algorithm to decode a received signal to obtain a desired signal. For example, a receiver type includes MMSE, MRC, MMSE-IRC, CRS canceller, SIC, and so on. MMSE and MRC are receiver types without interference reduction, and they are referred to as baseline receiver types. MMSE-IRC, CRS canceller, and so on are receiver types with interference reduction, and they are referred to as advanced receiver types. In order to operate the advanced receiver types, predetermined enhanced performance requirements should be met. It should be noted that these receiver types are merely presented as examples and any other receiver type may be used in an embodiment of the present invention.

For example, under the condition that detection of an interference signal is difficult as shown in FIG. 1, it is desired that an operation of a receiver in association with a receiver type with interference reduction should be disabled. Thus, a base station in accordance with an embodiment of the present invention generates and transmits a receiver type control signal indicating whether to allow an operation of a receiver in association with at least one receiver type. A mobile station in accordance with an embodiment of the present invention receives the receiver type control signal and configures an operation of a receiver based on the received receiver type control signal.

The mobile station and base station in accordance with an embodiment of the present invention are described in detail below.

<Configuration and Operation of Mobile Station>

Figure 2:
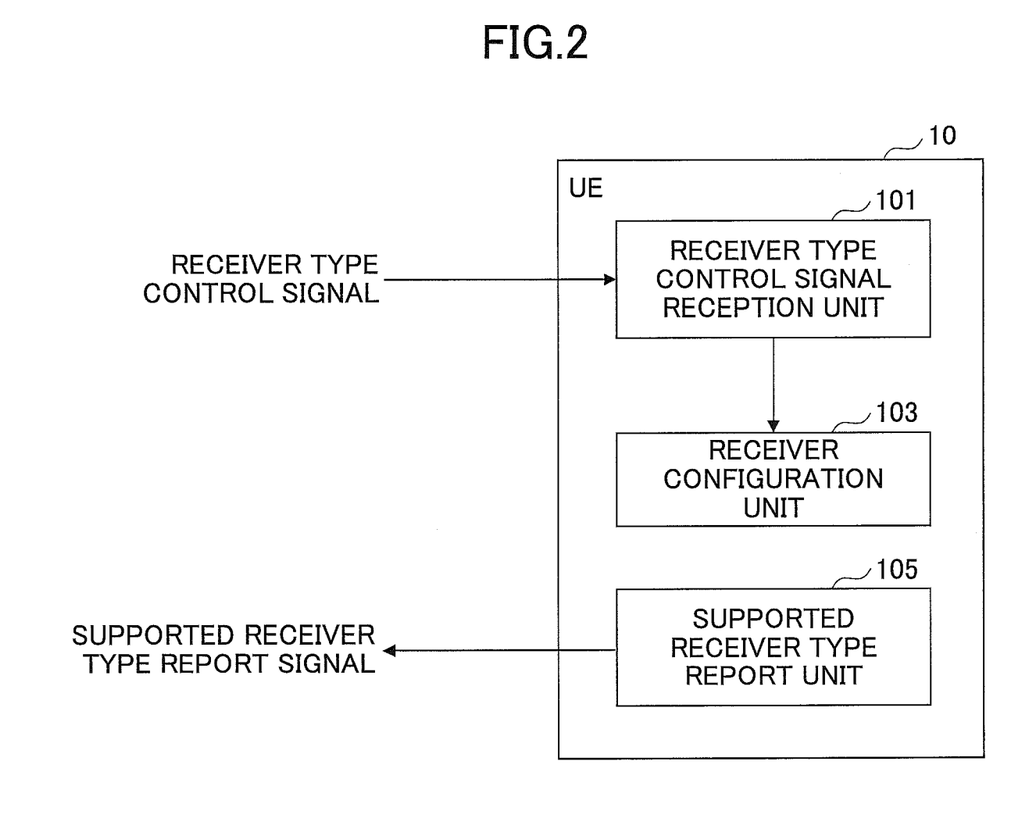
FIG. 2 shows a block diagram of a configuration of a mobile station in accordance with an embodiment of the present invention.

FIG. 2 shows a configuration of a mobile station 10 in accordance with an embodiment of the present invention. The mobile station 10 may be any suitable apparatus with a radio communication capability such as a cellular phone, a smart phone, or the like.

The mobile station 10 includes a receiver type control signal reception unit 101 and a receiver configuration unit 103. The mobile station 10 may further include a supported receiver type report unit 105.

The receiver type control signal reception unit 101 receives from a base station a receiver type control signal indicating whether to allow an operation of a receiver in association with at least one receiver type.

The receiver type control signal may be formed by a bit (for example, 1 or 0) to enable or disable an operation of each receiver type. For example, eight receiver types are used, the receiver type control signal may be formed by eight bits. Alternatively, the receiver type control signal may be formed by a bit (for example, 1 or 0) to enable or disable an operation of each advanced receiver type. For example, the eight receiver types include two baseline receiver types and six advanced receiver types, the receiver type control signal may be formed by six bits. Alternatively, the receiver type control signal may be formed by grouping receiver types depending on performance requirements of a receiver. For example, when the eight receiver types are classified into four groups according to performance requirements, the receiver type control signal may be formed by four bits.

Alternatively, the receiver type control signal may be a signal formed by setting a predetermined value to information used for interference reduction. For example, for the purpose of interference reduction in a mobile station, a base station needs to transmit transmission power information in an interference cell, information about a reference signal, information about a transmission rank number and a modulation scheme, and so on to the mobile station. When such information used for interference reduction includes data which cannot be recognized by the mobile station, the receiver type control signal may indicate that the operation in association with the receiver type is not allowed. While FIG. 1 shows a single interference cell, there may be a plurality of interference cells. Assuming that information used for interference reduction is transmitted in each of the interference cells, when a predetermined value is set in at least one piece of information, the receiver type control signal may indicate that the operation in association with the receiver type is not allowed. For example, a predetermined value is set in some or all pieces of information used for interference reduction, the receiver type control signal may indicate that the operation in association with the receiver type is not allowed.

As described above, for the purpose of interference reduction in a mobile station, a base station needs to transmit transmission power information in an interference cell, information about a reference signal, information about a transmission rank number and a modulation scheme, and so on to the mobile station. For example, in an LTE (Long Term Evolution) system, a base station transmits a power ratio between a reference signal and a data signal as transmission power information to a mobile station. The information about a reference signal includes a type of the reference signal (for example, CRS (Common Reference Signal), DM-RS (Demodulation Reference Signal), or the like), a reference signal sequence, a position in a time or frequency domain, the number of antenna ports, and so on. The transmission rank number represents the number of transmission streams (multiple streams or a single stream). The modulation scheme represents any one of QPSK (Quadrature Phase-Shift Keying), 16QAM, and so on.

Among information used for interference reduction, a mobile station operable in accordance with MMSE-IRC uses information (transmission power information, information about a reference signal, a transmission rank number) needed to estimate a channel against an interference signal. Among information used for interference reduction, a mobile station operable in accordance with SIC uses information (transmission power information, information about a reference signal, a transmission rank number) needed to estimate a channel against an interference signal and information (channel estimation value, modulation scheme) needed to decode a transmission signal against an interference signal. For example, when transmission power information is set to an infinite value, an operation of a receiver in association with an advanced receiver type such as MMSE-IRC, SIC, or the like which uses the transmission power information is not allowed. Alternatively, when information about a reference signal indicates an undefined type, an undefined reference signal sequence, an undefined position, an undefined number of antenna ports, or the like, an operation of a receiver in association with an advanced receiver type such as MMSE-IRC, SIC, or the like which uses the information about the reference signal is not allowed. Alternatively, when a transmission rank number is set to zero, an operation of a receiver in association with an advanced receiver type such as MMSE-IRC, SIC, or the like which uses the transmission rank number is not allowed. Alternatively, when a modulation scheme indicates a non-supported modulation scheme, an operation of a receiver in association with an advanced receiver type such as SIC or the like is not allowed. On the other hand, when a modulation scheme indicates a non-supported modulation scheme but transmission power information, information about a reference signal, and a transmission rank number are set to be respective values which can be recognized by a mobile station, an operation of a receiver in association with an advanced receiver type such as MMSE-IRC or the like may be allowed.

The receiver type control signal may be received by means of broadcast information or RRC (Radio Resource Control) signaling. The receiver type control signal may be received by means of broadcast information and may be further received by means of RRC signaling. Broadcast information is transmitted in common to mobile stations in a cell and RRC signaling is transmitted individually to each mobile station.

The receiver type control signal may indicate whether to allow an operation of a receiver, which is determined based on a connectivity state of a mobile station. For example, in an LTE system, a connected state in which a mobile station connects to a base station and can perform communication and an idle state in which a mobile station does not connect to a base station are defined. The receiver type control signal may indicate whether to allow an operation of a receiver for each state. For example, when the receiver type control signal is received by means of broadcast information, the broadcast information may include whether to allow the operation of the receiver during the connected state and whether to allow the operation of the receiver during the idle state. For example, when the receiver type control signal is received by means of RRC signaling, the RRC signaling upon connection may include whether to allow the operation of the receiver during the connected state and the RRC signaling upon connection release may include whether to allow the operation of the receiver during the idle state. For example, the operation of the receiver in association with an advanced receiver type may not be allowed during the idle state and the operation of the receiver in association with the advanced receiver type may be allowed during the connected state, for example.

The receiver type control signal may indicate whether to allow an operation of a receiver, which is determined based on a cell configuration. For example, in an LTE-A (LTe-Advanced) system, carrier aggregation is available and a SCell (Secondary Cell) in addition to a PCell (Primary Cell) can be used. When carrier aggregation is employed, an interference condition of each of the PCell and the SCell may differ. Thus, the receiver type control signal may indicate whether to allow an operation of a receiver in each of the PCell and the SCell. In addition, in an LTE-A system, a technology called CoMP (Coordinated Multi-Point transmission/reception) can be used to improve reception quality in a mobile station at a cell edge by coordinating data transmission in a plurality of cells. Since an interference condition may differ depending on a CoMP configuration, the receiver type control signal may indicate whether to allow an operation of a receiver according to the CoMP configuration. Furthermore, in an LTE-A system, a technology called eICIC (enhanced Inter-Cell Interference Coordination) can be used to reduce interference by controlling resources in a time or frequency domain. Since an interference condition may differ depending on an eICIC configuration, the receiver type control signal may indicate whether to allow an operation of a receiver according to the eICIC configuration.

The receiver configuration unit 103 configures the operation of the receiver based on the receiver type control signal received by the receiver type control signal reception unit 101. The receiver configuration unit 103 operates the receiver according to any one of the receiver types whose operation is allowed by the receiver type control signal. When the operation of the receiver in association with a plurality of receiver types is allowed, the receiver configuration unit 103 may configure the operation of the receiver based on a priority level received from a base station or a predetermined priority level configured in the mobile station 10. The priority level from the base statin may be received by means of the receiver type control signal or any other signal.

When the receiver type control signal is received by means of broadcast information and is further received by means of RRC signaling, the receiver configuration unit 103 may configure the operation of the receiver based on the receiver type control signal received by means of RRC signaling.

When the receiver type control signal indicates that the operation of the receiver in association with a supported receiver type is disabled, in other words, when the operation of the receiver in association with the supported receiver type is not allowed, the receiver configuration unit 103 may configure the operation of the receiver in association with a predetermined receiver type. The predetermined receiver type may be a baseline receiver type such as MMSE and MRC.

When whether to allow the operation of the receiver is indicated in the receiver type control signal based on a connectivity state of the mobile station, the receiver configuration unit 103 may configure the operation of the receiver when the connectivity state of the mobile station is changed. When whether to allow the operation of the receiver is indicated in the receiver type control signal based on a cell configuration, the receiver configuration unit 103 may configure the operation of the receiver when the cell configuration is changed.

The supported receiver type report unit 105 reports a supported receiver type to a base station. The supported receiver type may be reported as a UE capability when connected to the base station.

Figure 3:
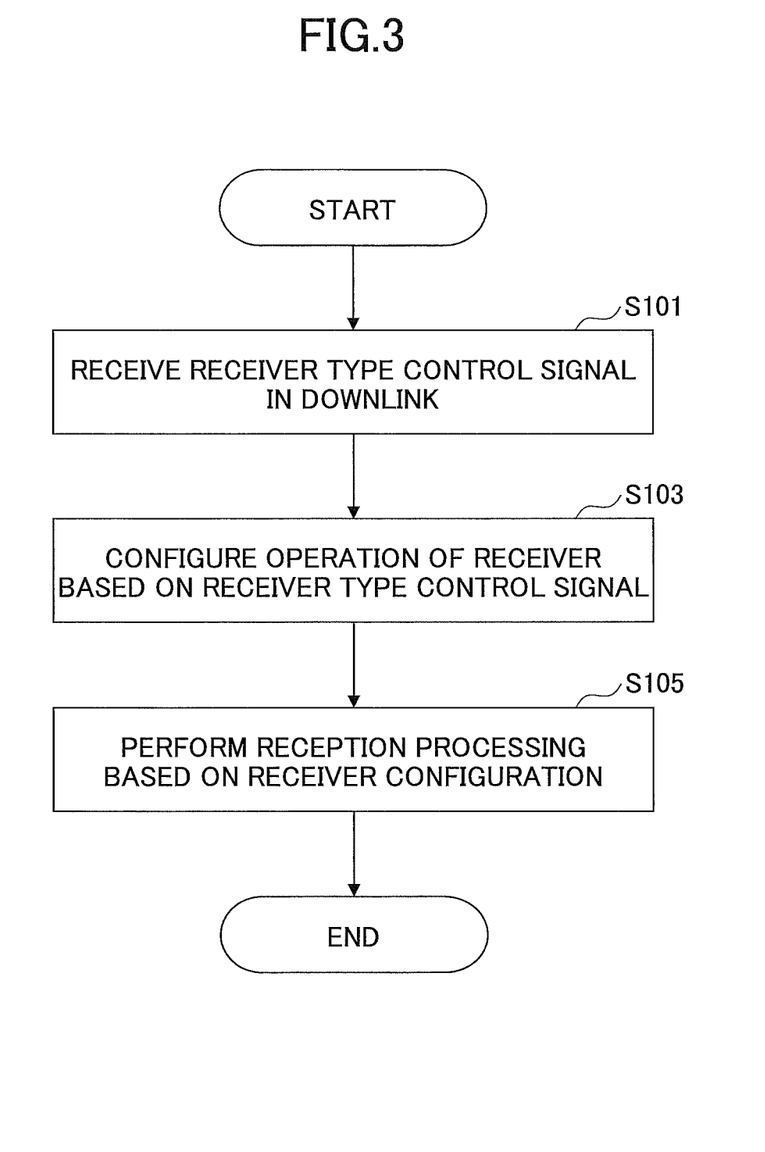
FIG. 3 shows a flowchart of a reception method in a mobile station in accordance with an embodiment of the present invention.

FIG. 3 shows a reception method in the mobile station in accordance with an embodiment of the present invention.

At step S101, the receiver type control signal reception unit 101 receives a receiver type control signal by means of downlink broadcast information or RRC signaling.

At step S103, the receiver configuration unit 103 configures an operation of a receiver based on the receiver type control signal. The receiver type configuration unit 103 operates the receiver according to any one of the receiver types whose operation is allowed by the receiver type control signal. In this step, a priority level may be taken into consideration. In addition, when the receiver type control signal is received by means of both broadcast information and RRC signaling, the RRC signaling may be prioritized.

At step S105, the receiver in the mobile station 10 processes a received signal according to the configured operation of the receiver.

<Configuration and Operation of Base Station>

Figure 4:
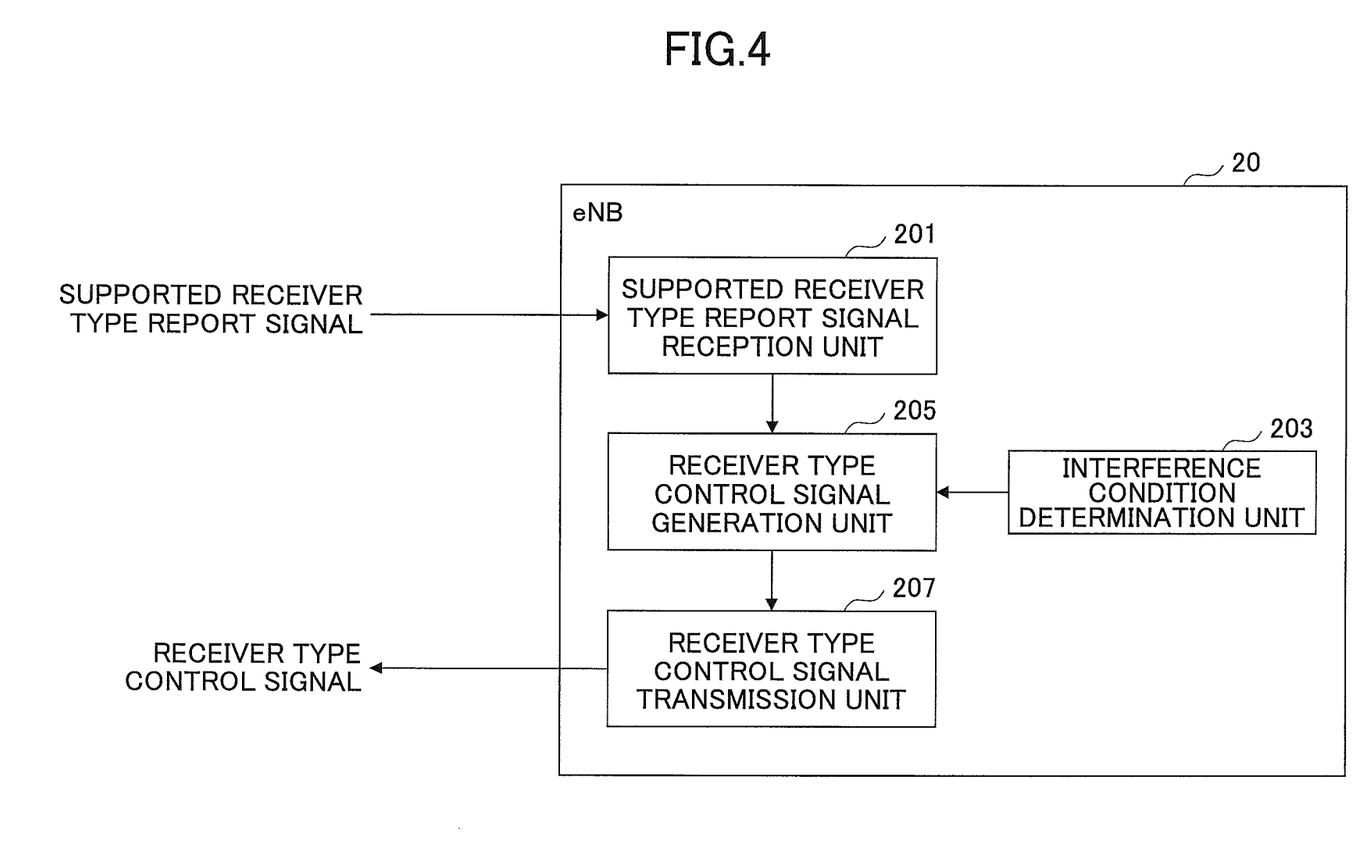
FIG. 4 shows a block diagram of a configuration of a base station in accordance with an embodiment of the present invention.

FIG. 4 shows a configuration of a base station 20 in accordance with an embodiment of the present invention. The base station 20 wirelessly connects to the mobile station 10 to transmit to the mobile station 10 downlink data received from a switching center or the like and to transmit to the switching center or the like uplink data received from the mobile station 10.

The base station 20 includes a receiver type control signal generation unit 205 and a receiver type control signal transmission unit 207. The base station may include a supported receiver type report signal reception unit 201 and an interference condition determination unit 203.

The supported receiver report signal receiver unit 201 receives a supported receiver type report signal indicating a receiver type supported by a mobile station. The supported receiver type report signal may be reported as a UE capability when the mobile station connects to the base station.

The interference condition determination unit 203 determines an interference condition caused by a neighbor cell. For example, the interference condition determination unit 203 may determine an interference condition caused by a neighbor cell based on a positional relationship with the neighbor cell or based on reception quality in a mobile station.

The receiver type control signal generation unit 205 generates a receiver type control signal indicating whether to allow an operation of a receiver in association with at least one receiver type. The receiver type control signal generation unit 205 may generate a receiver type control signal based on the interference condition determined by the interference condition determination unit 203. For example, when it is assumed that detection of an interference signal is difficult, the receiver type control signal generation unit 205 may generate a receiver type control signal indicating not to allow the operation of the receiver in association with a receiver type with interference reduction.

The receiver type control signal generation unit 205 may generate a receiver type control signal to be transmitted in common to mobile stations in a cell indicating whether to allow an operation of a receiver, and a receiver type control signal to be transmitted individually to each mobile station indicating whether to allow an operation of a receiver.

When the supported receiver type report signal reception unit 201 receives a supported receiver type report signal, the receiver type control signal generation unit 205 may generate a receiver type control signal indicating whether to allow the operation of the receiver in association with the receiver type supported by the mobile station.

As described above, the receiver type control signal may be formed by a bit (for example, 1 or 0) to enable or disable an operation of each receiver type. Alternatively, the receiver type control signal may be a signal formed by setting a predetermined value to information used for interference reduction.

As described above, the receiver type control signal generation unit 205 may determine whether to allow the operation of the receiver based on a connectivity state of the mobile station to generate a receiver type control signal.

Alternatively, the receiver type control signal generation unit 205 may determine whether to allow the operation of the receiver based on a cell configuration to generate a receiver type control signal.

In addition, the receiver type control signal generation unit 205 may set a priority level of the receiver type in the receiver type control signal.

The receiver type control signal transmission unit 207 transmits the receiver type control signal generated by the receiver type control signal generation unit 205. The receiver type control signal transmission unit 207 may transmit the receiver type control signal by means of broadcast information or RRC signaling. The receiver type control signal transmission unit 207 may transmit a receiver type control signal in common to mobile stations in a cell by means of broadcast information indicating whether to allow an operation of a receiver, and may transmit a receiver type control signal individually to each mobile station by means of RRC signaling indicating whether to allow an operation of a receiver.

Figure 5:
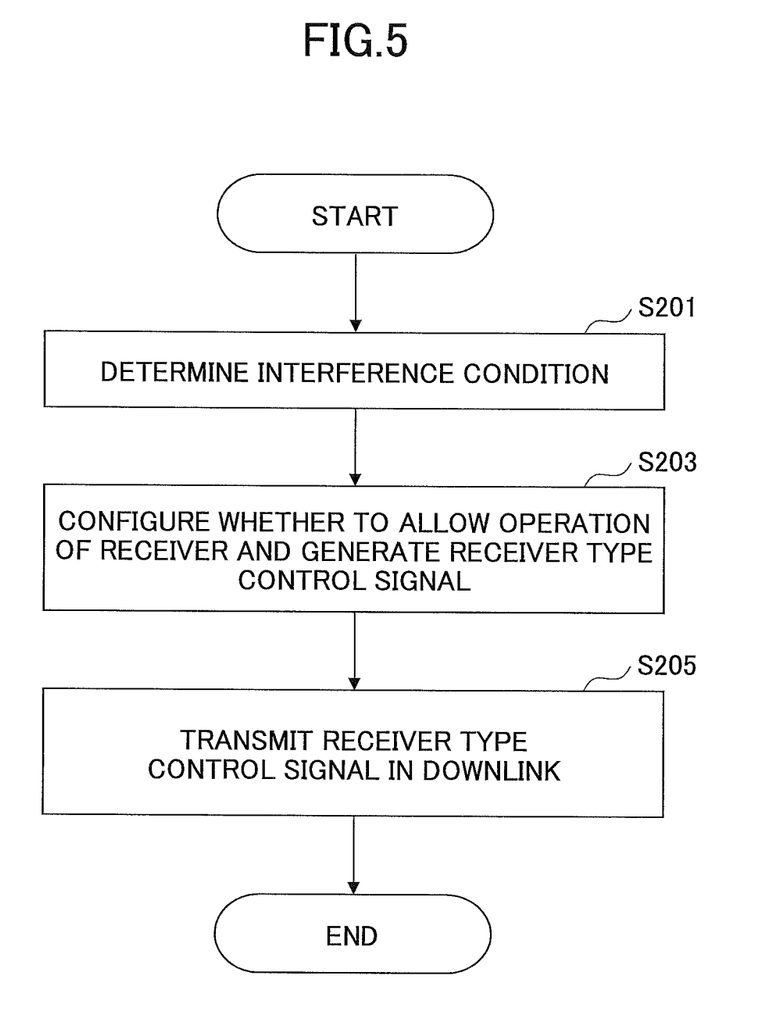
FIG. 5 shows a flowchart of a method of controlling an operation of a receiver in a base station in accordance with an embodiment of the present invention.

FIG. 5 shows a method of controlling an operation of a receiver in the base station in accordance with an embodiment of the present invention.

At step S201, the interference condition determination unit 203 determines an interference condition caused by a neighbor cell.

At step S203, the receiver type control signal generation unit 205 determines whether to allow an operation of a receiver in association with a receiver type and generates a receiver type control signal. In this step, the receiver type control signal generation unit 205 may specify a priority level. In addition, the receiver type control signal generation unit 205 may generate a receiver type control signal to be transmitted in common to mobile stations in a cell indicating whether to allow an operation of a receiver, and a receiver type control signal to be transmitted individually to each mobile station indicating whether to allow an operation of a receiver.

At step S205, the receiver type control signal transmission unit transmits the receiver type control signal by means of downlink broadcast information or RRC signaling.

<Effects of Embodiments>

According to an embodiment of the present invention, it is possible to improve quality of a desired signal in a mobile station by determining in a base station an interference condition caused by another cell, for example, and indicating whether to allow an operation of a receiver in association with a receiver type.

By using broadcast information or RRC signaling, it is possible to control operations of receivers in mobile stations in an entire cell and also control an operation of a receiver in each mobile station. For example, when it is assumed that detection of an interference signal is difficult, operations of receivers in association with an advanced receiver type may not be allowed by means of broadcast information, but an operation of a receiver in association with an advanced receiver type only for a mobile station situated in a particular position may be allowed.

Even if the operation of the receiver in association with all the receiver types is not allowed, the receiver may operate according to a baseline receiver type, which can avoid a situation where a mobile station cannot receive a signal.

In addition, by determining whether to allow an operation of a receiver considering a connectivity state of a mobile station, a cell configuration, or the like, the operation of the receiver suitable for an interference condition can be possible.

For convenience of explanation, the mobile station and the base station according to the embodiments of the present invention have been described with reference to functional block diagrams, but the mobile station and the base station may be implemented in hardware, software, or combinations thereof. In addition, two or more functional elements may be combined as appropriate. The method according to the embodiments of the present invention has been described with reference to flowcharts, but the method may be carried out in a different order from the order shown in the embodiments.

While the approaches are described above to improve quality of a desired signal in a mobile station by determining in a base station an interference condition caused by another cell, for example, and indicating whether to allow an operation of a receiver in association with a receiver type, the present invention is not limited to the these embodiments, and variations, modifications, alterations, and substitutions can be made by those skilled in the art without deviating from the spirit of the present invention.

The present international application is based on and claims the benefit of priority of Japanese Patent Application No. 2012-288897 filed on Dec. 28, 2012, the entire contents of which are hereby incorporated by reference.

DESCRIPTION OF NOTATIONS 10 mobile station
101 receiver type control signal reception unit
103 receiver configuration unit
105 supported receiver type report unit
20 base station
201 supported receiver type report signal reception unit
203 interference condition determination unit
205 receiver type control signal generation unit
207 receiver type control signal transmission unit The inventions claimed is:

1. A mobile station, comprising:
a receiver that receives a receiver type control signal indicating at least one of whether to allow an operation of a baseline receiver type in which interference reduction is not performed upon decoding a received signal and whether to allow an operation of an advanced receiver type in which interference reduction is performed upon decoding a received signal; and
a processor that selects a receiver type to be used to decode a received signal based on the received receiver type control signal,
wherein when the receiver type control signal indicates that the operation of a supported receiver type is not allowed, the processor selects a predetermined receiver type.

2. The mobile station as claimed in claim 1, wherein the processor selects the receiver type based on a priority level received from a base station or a predetermined priority level.

3. The mobile station as claimed in claim 1, wherein the receiver type control signal indicates whether to allow the operation of the receiver, which is determined based on a connectivity state of the mobile station.

4. The mobile station as claimed in claim 1, wherein the receiver type control signal indicates whether to allow the operation of the receiver, which is determined based on a cell configuration.

5. The mobile station as claimed in claim 1, wherein the receiver type control signal is a signal generated by setting a predetermined value to information used for interference reduction.

6. The mobile station as claimed in claim 1,
wherein the processor reports a supported receiver type to a base station.

7. A reception method in a mobile station, comprising:
receiving a receiver type control signal indicating at least one of whether to allow an operation of a baseline receiver type in which interference reduction is not performed upon decoding a received signal and whether to allow an operation of an advanced receiver type in which interference reduction is performed upon decoding a received signal; and
selecting a receiver type to be used to decode a received signal based on the received receiver type control signal,
wherein when the receiver type control signal indicates that the operation of a supported receiver type is not allowed, the selecting selects a predetermined receiver type.

8. A mobile station, comprising:
a receiver that receives a receiver type control signal indicating at least one of whether to allow an operation of a baseline receiver type in which interference reduction is not performed upon decoding a received signal and whether to allow an operation of an advanced receiver type in which interference reduction is performed upon decoding a received signal; and
a processor that selects a receiver type to be used to decode a received signal based on the received receiver type control signal,
wherein the receiver receives the receiver type control signal by means of broadcast information or radio resource control signaling, and
wherein when the receiver type control signal is received by means of the broadcast information and also by means of the radio resource control signaling, the processor selects the receiver type based on the receiver type control signal received by means of the radio resource control signaling.

9. A reception method in a mobile station, comprising:
receiving a receiver type control signal indicating at least one of whether to allow an operation of a baseline receiver type in which interference reduction is not performed upon decoding a received signal and whether to allow an operation of an advanced receiver type in which interference reduction is performed upon decoding a received signal; and
selecting a receiver type to be used to decode a received signal based on the received receiver type control signal,
wherein the receiving receives the receiver type control signal by means of broadcast information or radio resource control signaling, and
wherein when the receiver type control signal is received by means of the broadcast information and also by means of the radio resource control signaling, the selecting selects the receiver type based on the receiver type control signal received by means of the radio resource control signaling.

* * * * *